July 10, 1951  A. V. PETTMAN  2,559,996
ROTARY CUTTER HEAD
Filed Jan. 3, 1949
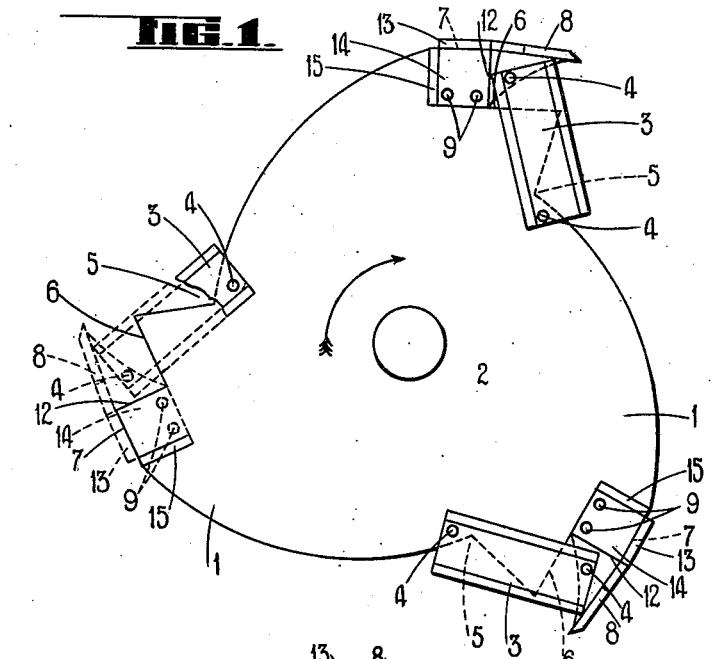
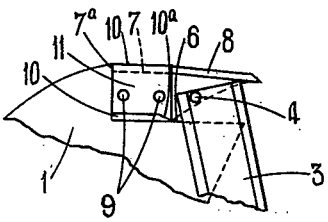
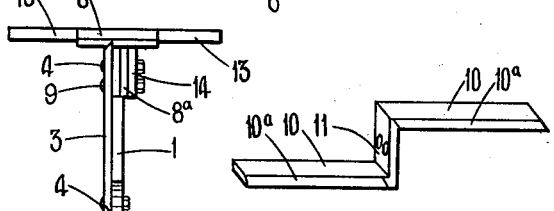
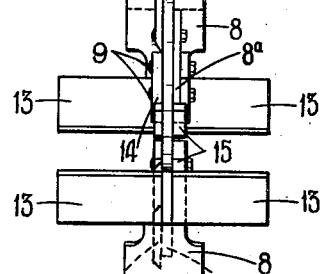
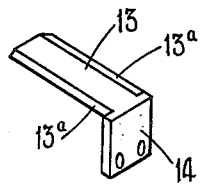
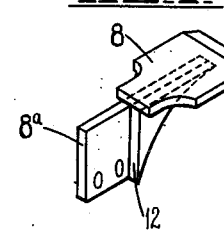
Inventor
A. V. Pettman
By Glascock Downing Weible
Attys.

Patented July 10, 1951

2,559,996

UNITED STATES PATENT OFFICE 2,559,996

ROTARY CUTTERHEAD

Albert Vinten Pettman, Epsom, New Zealand

Application January 3, 1949, Serial No. 69,023
In New Zealand January 19, 1948

4 Claims. (Cl. 97—212)

The invention relates to rotary cultivators of the type wherein there is provided a hub adapted for mounting on a shaft to rotate therewith, and arms with curved outer ends extending therefrom, curved cutters fitted to the extremities of the arms, providing continuations of the curves thereof, and being adapted to make cuts in the ground in the direction of rotation of the cultivator, while blade cutters are secured on said arms, so as to make cuts in or parallel with the plane through which the cultivator rotates, and wing cutters are secured on said arms at each side thereof, to follow the other cutters, and make cuts in the ground across the cuts made by said other cutters.

This application is a continuation-in-part of my copending application S. N. 765,061, filed July 31, 1947.

The object of the present invention, is to provide improvements in the aforesaid type of rotary cultivator so as to increase the efficiency thereof by ensuring freedom from blockage by, and accumulation of rubbish on the cultivator when in operation, one of the improvements residing in the arrangement of the cutters, whereby everything in the path of the cultivator is first cut at the surface of the ground by cutters which operate through a vertical plane, so as to make a cut in the ground in or parallel with the plane through which the cultivator operates.

Other improvements provided by the present invention are directed to the manner of forming and fitting the cross cutters to the arms so as to provide the cultivated depth of soil, with a bottom of more or less grooved or corrugated formation, and also to facilitate the fitting of said cutters in a manner which will give maximum strength to the construction, while still further improvements reside in the form, arrangement and mounting of the arms and cutters, to ensure simplicity, strength, and general efficiency of the apparatus.

A cultivator provided with these improvements, comprises arms on a disc or the like, adapted for mounting on a shaft to rotate therewith; cross cutters mounted on said arms; and blade cutters fitted to said arms and across the gaps between same, so as to present in advance of the said cross cutters, cutting edges which make a cut in the ground, in or parallel with the plane through which the cultivator rotates.

Each arm has mounted thereon a leading cross cutter, and one or a plurality of wing cross cutters, so as to provide cutting edges at opposite sides of the arm, said cutting edges being located at different distances from the centre of the cultivator, whereby the bottom of the cultivated depth of soil is given a grooved or corrugated formation, by the operation of the cultivator.

A rotary cultivator having the improvements applied thereto, is illustrated in the accompanying drawings, Figure 1 being a side elevation of the improved cultivator, Figure 2 an elevation of same at right angles to the view in Figure 1, while Figure 3 illustrates one of the wing or following cross cutters, and Figure 4 illustrates one of the leading cross cutters, Figure 5 is a part side elevation of the cultivator incorporating an alternative form of wing or following cross cutter and Figure 6 illustrates the form of wing or following cross cutter used in Fig. 5.

The cultivator in its improved form is provided with arms 1 formed more or less radially on a disc 2 adapted for mounting and securing by welding or other approved means on a shaft so as to rotate therewith.

In this form of cultivator the leading cutters are provided by blade cutters 3, preferably double edged so as to be reversible, detachably secured by bolts 4 across the gaps or spaces 5 between the arms 1 so as to present in advance of cross cutters, to be described, secured on the arms 1, cutting edges which make a cut in the ground in or parallel with the plane through which the cultivator rotates, said cutting edges providing for the cutting or severing on or against the surface of the ground of everything the cultivator comes in contact with before the cross cutters act thereon.

The outer ends of the arms 1 are stepped as at 6 and 7, leading cross cutters 8 being fitted across the leading steps 6 on the arms 1, and across the outer ends of the preceding reversible leading blade cutters 3 of the cultivator secured across the gaps or spaces 5 between the arms 1, said leading cross cutters 8 being provided with stops 12 and being fitted so that said stops 12 butt against the backs of the leading steps 6 to relieve the bolts 9 of strain, and also so that they have flat sided rearwardly extending shanks $8^a$, which extend at one side of the following step 7, and can be bolted thereto by the same bolts 9 as are used in securing wing or following cross cutters 13 on and to the arms 1.

The wing or following cross cutters 13 shown in Figures 1 and 2 are each as illustrated in Figure 3 with double cutting edges 13ᵃ so as to be reversible, and with portions 14 through which they are enabled to be secured by the bolts 9 one at each side of each arm 1, with their rear edges positioned closer to the centre of the cultivator than the front edges of the leading cross cutters 8, so as to enable the bottom of the cultivated depth of soil to be given the grooved or corrugated formation aforesaid.

Stops 15 are provided on the arms 1 for the portions 14 of the cutters 13 to butt against and so relieve the bolts 9 of strain.

In the arrangement shown in Figs. 5 and 6, the wing or following cross cutters 10 extend across the extremities of the arms 1, and are each constituted by a single piece of flat metal given a stepped formation, and forward cutting edges 10ᵃ, said wing or following cross cutters 10 being fitted across the rear steps 7 on the arms 1 so as to butt against the backs 7ᵃ of said rear steps 7, to relieve the bolts 9 of strain, and also so that the cutting edges 10ᵃ at opposite sides of the cultivator are located at different distances from the centre thereof, so as to enable the grooved or corrugated formation to be given to the bottom of the cultivated depth of soil.

In securing the wing or following cross cutters 10 across the extremities of the arms 1, the connecting portions 11 between the steps of the wing or cross cutters 10, are located at the opposite side of the arms 1 to the flat sided rearwardly extending shanks 8ᵃ of the leading cross cutters 8, so that the bolts 9 used to secure the latter to the arms 1 are also enabled to be used to secure the wing or following cross cutters 10 thereon.

What I do claim and desire to obtain by Letters Patent of the United States of America is:

1. A rotary cultivator comprising a disc adapted to be mounted on a shaft to rotate therewith, arms extending radially from the disc and having the outer ends spaced therefrom to leave gaps, leading cross cutters mounted on said arms, blade cutters fitted to said arms and extending across the gaps so as to present in advance of said cross cutters, cutting edges which make a cut in the ground in or parallel with the plane through which the disc rotates, the leading cross cutters being disposed across the outer ends of the preceding blade cutters, and wing-like following cross cutters also secured to the arms rearwardly of the leading cross cutters and having their cutting edges located at different distances from the center of the cultivator than the cutting edges of the leading cross cutters.

2. A rotary cultivator, as claimed in claim 1, and wherein the arms are stepped at their extremities, and each arm has mounted thereon one of said leading cross cutters formed and fitted to extend across the leading step on the arm, and across the outer end of the preceding blade cutter so as to butt against the back of the leading step, each leading cross cutter having a rearwardly extending shank located at one side of the following step on the arm, the latter also having mounted thereon the wing-like following cross cutters to provide cross cutting edges at opposite sides of the following step of the arm.

3. A rotary cultivator as claimed in claim 1 wherein the wing-like following cross cutters are each stepped throughout their lengths and provided with cutting edges at opposite sides of the arms, said cutting edges being located at different distances from the center of the cultivator.

4. A rotary cultivator comprising a disc adapted to be mounted on a shaft so as to rotate therewith, arms extending radially from the disc and having their outer ends stepped and spaced from the disc so as to leave gaps, leading cross cutters mounted on the outer ends of the arms and extending forwardly of the stepped ends thereof, blade cutters fitted to said arms and extending across the gaps and secured to the leading cross cutters and presenting in advance of the cross cutters cutting edges which make a cut in the ground parallel with the plane through which the disc rotates and wing-like following cross cutters also secured to the stepped outer ends of the arms rearwardly of the leading cross cutters and located at different distances from the center of the disc than the leading cross cutters.

ALBERT VINTEN PETTMAN.

REFERENCES CITED

The following references are of record in the file of this patent:

UNITED STATES PATENTS

| Number | Name | Date |
| --- | --- | --- |
| 1,534,098 | Wood | Apr. 21, 1925 |
| 1,583,063 | Mankel | May 4, 1926 |
| 1,661,692 | Everist | May 6, 1928 |
| 1,699,151 | Miller et al. | Jan. 15, 1929 |